US012583786B2

(12) United States Patent
Hu et al.

(10) Patent No.: US 12,583,786 B2
(45) Date of Patent: Mar. 24, 2026

(54) MULTI-NUCLEUS COMPOSITE TRANSPARENT GLASS- CERAMIC AND PREPARATION METHOD THEREFOR

(71) Applicant: CHONGQING AUREAVIA HI-TECH GLASS CO., LTD., Chongqing (CN)

(72) Inventors: Wei Hu, Chonqing (CN); Baoquan Tan, Chonqing (CN); Hao Huang, Chonqing (CN); Wencheng Qin, Chonqing (CN); Yanqi Zhang, Chonqing (CN)

(73) Assignee: CHONGQING AUREAVIA HI-TECH GLASS CO., LTD., Chongqing (CN)

( * ) Notice: Subject to any disclaimer, the term of this patent is extended or adjusted under 35 U.S.C. 154(b) by 918 days.

(21) Appl. No.: 17/786,771

(22) PCT Filed: Dec. 18, 2020

(86) PCT No.: PCT/CN2020/137725
§ 371 (c)(1),
(2) Date: Jun. 17, 2022

(87) PCT Pub. No.: WO2021/121404
PCT Pub. Date: Jun. 24, 2021

(65) Prior Publication Data
US 2023/0031267 A1 Feb. 2, 2023

(30) Foreign Application Priority Data
Dec. 20, 2019 (CN) .......................... 201911327940.0

(51) Int. Cl.
*C03C 10/00* (2006.01)
*C03B 25/00* (2006.01)
*C03B 32/02* (2006.01)
*B82Y 30/00* (2011.01)

(52) U.S. Cl.
CPC .......... *C03C 10/0036* (2013.01); *C03B 25/00* (2013.01); *C03B 32/02* (2013.01); *B82Y 30/00* (2013.01)

(58) Field of Classification Search
CPC .............. C03C 10/0036; C03C 21/002; C03C 10/0018; C03C 10/0027
See application file for complete search history.

(56) References Cited

U.S. PATENT DOCUMENTS

2017/0144921 A1 * 5/2017 Beall ....................... C03C 3/097
2020/0156994 A1 5/2020 Li et al.
2020/0346969 A1 11/2020 Li et al.

FOREIGN PATENT DOCUMENTS

| CN | 107001120 A | 8/2017 |
| CN | 107902909 A | 4/2018 |
| CN | 109320091 A | 2/2019 |
| CN | 110981206 A | 4/2020 |
| KR | 20170060156 A | 5/2017 |
| TW | 201925129 A | 7/2019 |
| WO | 2016057748 A1 | 4/2016 |
| WO | 2019022033 A1 | 1/2019 |
| WO | 2019167850 A1 | 9/2019 |

OTHER PUBLICATIONS

Extended EP Search Report mailed Dec. 11, 2023, EP App No. 20903625.0-1108, 6 pages.
International Search Report for PCT/CN2020/137725, mailed Mar. 8, 2021, 7 pages.
Office Action issued in Korean Appl. No. 10-2022-7024938, mailed Mar. 19, 2024, 10 pages.

* cited by examiner

*Primary Examiner* — Cameron K Miller
(74) *Attorney, Agent, or Firm* — Cozen O'Connor

(57) ABSTRACT

Disclosed in the present invention is a multi-crystal nucleus transparent glass-ceramic and a preparation method therefor, said preparation method comprising the following steps: during glass production, adding a plurality of types of nucleation agents, and after processing, acquiring a mother glass having certain outer dimensions; and placing the mother glass obtained in S2 under a temperature of T1 and heating for 1h-6h to perform annealing treatment, after the annealing treatment is complete, placing under a temperature of T2 and heating 1h-6h to perform nucleation treatment, and after nucleation treatment is complete, placing under a temperature of T3 and heating 0-3h to perform crystallization treatment. T1<T2. The present invention produces a glass-ceramic containing multiple types of crystal nuclei and having crystal phases of lithium disilicate and petalite. The multiple crystal nuclei reduces the nucleation and crystallization energies required for devitrification, thus being able to reduce thermal treatment temperature and time, and adjust the ratio of crystals. The glass-ceramic prepared by means of the present preparation method features an increased damage resistance, good fracture toughness, and a broad application range.

15 Claims, No Drawings

MULTI-NUCLEUS COMPOSITE TRANSPARENT GLASS- CERAMIC AND PREPARATION METHOD THEREFOR

FIELD OF THE INVENTION

The present invention relates to the technical field of production and manufacture of glass, in particular to a multi-crystal nucleus composite transparent glass-ceramic and a preparation method thereof.

BACKGROUND OF THE INVENTION

Glass-ceramic is a kind of composite material made via high temperature melting, molding and heat treatment which combines crystal phase and glass phase. Generally, a nucleation agent is added to raw material of glass, and during the heat treatment, nucleation and crystallization are controlled, so as to realize an overall crystallization with a large number of microcrystals. Compared with glass, glass-ceramic is widely used in electronic products with large-area touch screen such as smartphones and tablet computers, because the glass-ceramic comprises uniform crystals with dimensions generally less than 10 μm, the strength of which is an order of magnitude higher than that of ordinary glass.

Current commercial glass-ceramic products are prepared based on adding an amount of a single type of nucleation agent prior to melting the glass, for instance, adding $TiO_2$ or $ZrO_2$ or $P_2O_5$, etc. The nucleation agent is first dissolved in the glass during the melting process. During heat treatment, crystal nuclei are obtained by phase separation or direct nucleation, and subjected to crystallization to prepare high-strength glass-ceramic.

Known glass-ceramic materials have limited structural strength because during the preparation process, only a single type of nucleation agent is added and the crystal phase is unitary. Meanwhile, due to the small number and limited proportion of crystal nuclei in glass-ceramic, glass-ceramic materials often present inherent brittleness and low tensile strength, which lead to poor damage resistance and fracture toughness of the same. Moreover, the small number of crystal nuclei will easily result in relatively large crystals (larger than 100 nm), which affects visible light transmission of glass-ceramics. Accordingly, the glass-ceramics have limited application ranges and a reduced practicability. For example, existing glass-ceramics have visible light transmittances of less than 85%, all of which cannot be used for display cover plates of electronic products. Therefore, it is urgent to improve the brittleness and tensile strength of glass-ceramic materials in order to enhance the damage resistance, fracture toughness and tensile strength of glass-ceramics. On the other hand, it is necessary to reduce the crystal size and to improve the visible light transmittance, so as to improve the practicality of glass-ceramics.

Therefore, there are deficiencies in the prior art, which need to be improved.

SUMMARY OF THE INVENTION

The purpose of the present invention is to overcome the deficiencies of the prior art, and to provide a multi-crystal nucleus composite transparent glass-ceramic and the preparation method thereof. The glass-ceramic contains a variety of crystal nuclei, and a large number of crystal nuclei with small crystal size, and the damage resistance and the fracture toughness of the glass-ceramic are strong. Meanwhile, the glass-ceramic has a visible light transmittance of more than 85% and can be applied to the fields of electronic product cover plates and the like with strong practicability. The crystal phase of the glass-ceramic is lithium disilicate and petalite, in which different crystal phases are intertwined with each other to enhance the damage resistance, so that the damage resistance of the glass-ceramics are twice more than that of glass-ceramics with unitary crystal phase.

The technical scheme of the present invention is as follows: a multi-crystal nucleus composite transparent glass-ceramic, wherein a crystal nucleus comprises at least two of $ZrO_2$, $TiO_2$, $P_2O_5$, rare earth element, gold, silver and fluoride; a crystal phase comprises lithium disilicate and petalite; a surface compressive stress at any side of the glass-ceramic ranges from 400 MPa to 600 MPa; a depth of compressive stress layer in the glass-ceramic ranges from 10 μm to 100 μm; and a tensile stress linear density of the glass-ceramic is more than 30000 MPa/mm.

Further, the fluoride in the crystal nucleus is NaF and/or $CaF_2$; and the rare earth element in the crystal nucleus is La and/or Tm.

Further, the crystal nucleus comprises at least three of $ZrO_2$, $TiO_2$, $P_2O_5$, rare earth element, gold, silver, and fluoride.

Further, the surface compressive stress at any side of the glass-ceramic ranges from 500 MPa to 600 MPa, and the depth of compressive stress layer in the glass-ceramic ranges from 20 μm to 90 μm.

Further, the glass-ceramic has an average crystal size of 50 nm to 150 nm; a mass proportion of the crystal is more than or equal to 80%; and the glass-ceramic with a thickness of 1 mm at this time has the average visible light transmittance of 86% to 93%. The average crystal size of the glass-ceramics is controlled at 50 nm to 150 nm with small crystal size, and the average visible light transmittance of the glass-ceramics with a thickness of 1 mm is 86% to 93%, which visible light transmittance is higher than that in the prior art, so that the glass-ceramics have a wider range of applications, and an improved practicability.

Further, the glass-ceramic has the tensile stress linear density within a range from 30000 MPa/mm to 44000 MPa/mm.

The present invention further provides a method for preparing a multi-crystal nucleus composite transparent glass-ceramic, comprising the following steps:

S1: adding a nucleation agent when melting raw materials to prepare a glass.

S2: obtaining a glass article with a dimension from the glass obtained in S1.

S3: heating the glass article obtained in S2 at a temperature T1 for 1 h to 6 h for annealing treatment; after finishing the annealing treatment, heating at a temperature T2 for 1 h to 6 h to perform nucleation treatment; after finishing the nucleation treatment, heating at a temperature T3 for 0 to 3 h to perform crystallization treatment, so as to prepare the glass-ceramic; wherein the temperature T1 ranges from 450° C. to 550° C., the temperature T2 ranges from 500° C. to 580° C., and the temperature T3 ranges from 600° C. to 800° C., and T1<T2.

Further, the nucleation agent added in the step S1 comprises at least two of $ZrO_2$, $TiO_2$, $P_2O_5$, $NaF+CaF_2$, and La+Tm, and the content of the nucleation agent if added is: $ZrO_2$: 1 mol % to 3 mol %, $TiO_2$: 0.5 mol % to 1.5 mol %, $P_2O_5$:1 mol % to 3 mol %, $NaF+CaF_2$: 0 mol % to 4 mol %, La+Tm: 0.1 mol % to 1 mol %. At least two of nucleation agents among $ZrO_2$, $TiO_2$, $P_2O_5$, $NaF+CaF_2$, La+Tm are added during the glass melting process, and the prepared glass-ceramics contain various types of crystal nuclei, which increases the types of crystal nuclei, and thus decreases the nucleation and crystallization energy required for crystal precipitation and reduces temperature and time of the heat treatment.

Further, the glass in step S1 comprises: $SiO_2$: 65 mol % to 75 mol %, $Al_2O_3$: 6 mol % to 13 mol %, $B_2O_3$: 1 mol % to 3 mol %, $MgO_2$: 0 mol % to 7 mol %, ZnO: 1 mol % to 2 mol %, $K_2O$: 1 mol % to 3 mol %, $Na_2O$: 1 mol % to 7 mol %, $Li_2O$: 10 mol % to 20 mol %, CeO: 0.1 mol % to 0.25 mol %, $SnO_2$: 0.2 mol % to 0.3 mol %.

Further, in step S3, the temperature T1 ranges from 500° C. to 550° C., the temperature T2 ranges from 560° C. to 580° C., and the temperature T3 ranges from 700° C. to 800° C., and T1<T2.

Further, in the method for preparing a multi-crystal nucleus composite transparent glass-ceramic, after step S3, the method further comprises step S4: placing the glass-ceramic obtained in S3 into a salt bath containing at least one of sodium nitrate, potassium nitrate, sodium carbonate, and potassium carbonate for at least one strengthening treatment, thereby preparing a reinforced glass-ceramic.

Further, the salt bath contains at least two of sodium nitrate, potassium nitrate, sodium carbonate and potassium carbonate.

Further, two strengthening treatments are performed in step S4, and a temperature of a first strengthening treatment is 380° C. to 450° C., and a strengthening time is 1 h to 10 h; and a temperature of the second strengthening treatment is 380° C. to 450° C., and a strengthening time is 10 min to 240 min.

By employing the above-mentioned technical solutions, the present invention provides a multi-crystal nucleus composite transparent glass-ceramic and the preparation method thereof. Various types of crystal nuclei are allowed to present in the glass by adding at least two of nucleation agents $ZrO_2$, $TiO_2$, $P_2O_5$, $NaF+CaF_2$, La+Tm during the glass melting process, and placing under the conditions of T1, T2, and T3 to perform annealing treatment, nucleation treatment, and crystallization treatment, respectively, to prepare glass-ceramics having a variety of crystal nuclei and a large number of crystal nuclei with crystal phases of lithium disilicate and petalite. The formed multi-crystal nucleus reduces the nucleation energy and crystallization energy required for crystal precipitation, and is capable of decreasing temperature and time of the heat treatment, adjusting the proportion of crystals, and reducing the crystal size, so that the damage resistance and fracture toughness of glass-ceramics will be enhanced. Meanwhile, the two crystal phases of lithium disilicate and petalite are intertwined with each other to enhance the damage resistance, thereby improving the service life of glass-ceramics. Since the prepared glass-ceramic has a large number of crystal nuclei and a variety of crystal nuclei, the crystallization energy of the crystal can be effectively reduced, which is beneficial to the uniform distribution of the crystal phase in the glass-ceramic, to reduce the crystal size, to improve the visible light transmittance, and to enhance practicality of the glass-ceramic. The above-mentioned technical solutions can also be applied to any other glass. According to different components and requirements, the corresponding conditions can be changed to prepare different glass-ceramics, and the preparation method has high versatility.

DETAILED DESCRIPTION OF THE INVENTION

The present invention will be described in detail below with reference to specific embodiments.

The present invention provides a multi-crystal nucleus composite transparent glass-ceramic. The crystal nucleus comprises at least two of $ZrO_2$, $TiO_2$, $P_2O_5$, rare earth element, gold, silver and fluoride. The crystal phase comprises lithium disilicate and petalite. The surface compressive stress at any side of the glass-ceramic ranges from 400 MPa to 600 MPa. The depth of compressive stress layer in the glass-ceramic ranges from 10 μm to 100 μm. The tensile stress linear density of the glass-ceramic is more than 30000 MPa/mm. The crystal nucleus contains at least two of $ZrO_2$, $TiO_2$, $P_2O_5$, rare earth element, gold, silver, and fluoride. There are at least two types of crystal nuclei. In addition, the crystal phases of the glass-ceramic are lithium disilicate and petalite, and the different crystal phases are intertwined with each other to enhance its damage resistance, so that the damage resistance of the glass-ceramic is twice more than that of a glass-ceramic with unitary crystal phase. The surface compressive stress at any side of the formed glass-ceramic ranges from 400 MPa to 600 MPa, and the tensile stress linear density is more than 30000 MPa/mm, which enhances the tensile strength and damage resistance of glass-ceramics and improves the service life of glass-ceramics. Specifically, in an embodiment of the present invention, the fluorides in the crystal nucleus are NaF and $CaF_2$, and the rare earth element in the crystal nucleus are La and Tm. Preferably, the crystal nucleus comprises $ZrO_2$, $TiO_2$, $P_2O_5$, $NaF+CaF_2$, and La+Tm. Specifically, in an embodiment of the present invention, the surface compressive stress at any side of the glass-ceramics ranges from 500 MPa to 600 MPa; the tensile stress linear density of the glass-ceramics ranges from 30000 MPa/mm to 44000 MPa/mm; the depth of compressive stress layer of the glass-ceramics ranges from 20 μm to 90 μm; the average crystal size of the glass-ceramics is 50 nm to 150 nm; the mass proportion of the crystal is more than or equal to 80%, and the average visible light transmittance of the glass-ceramics of 1 mm thick is 86% to 93%. In the present invention, the average crystal size of the glass-ceramics is controlled at 50 nm to 150 nm, which crystal size is small, and the average visible light transmittance of the glass-ceramics of 1 mm thick is 86% to 93%, which visible light transmittance is higher than that of the glass-ceramics in the prior art, so that the glass-ceramics have broad application prospects with improved practicality. The glass-ceramic of the present invention has a variety of crystal nuclei, and a large number of crystals with a small crystal size, and has better mechanical properties than ordinary glass-ceramics, especially in terms of damage resistance, fracture toughness and strength, which improves the service life of the glass-ceramics.

The present invention further provides a method for preparing a multi-crystal nucleus composite transparent glass-ceramic, comprising the following steps:

S1: adding a nucleation agent when melting raw materials to prepare a glass;

S2: obtaining a glass article with a dimension from the glass obtained in S1; and S3: heating the glass article obtained in S2 at a temperature T1 for 1 h to 6 h for annealing treatment; after finishing the annealing treatment, heating at a temperature T2 for 1 h to 6 h to perform nucleation treatment; after finishing the nucleation treatment, heating at a temperature T3 for 0 to 3 h to perform crystallization treatment, so as to prepare the glass-ceramic; wherein the temperature T1 ranges from 450° C. to 550° C., the temperature T2 ranges from 500° C. to 580° C., and the temperature T3 ranges from 600° C. to 800° C., and T1<T2.

Specifically, in an embodiment of the present invention, the nucleation agent added in step S1 comprises at least two of $ZrO_2$, $TiO_2$, $P_2O_5$, $NaF+CaF_2$, and $La+Tm$, wherein a content of each nucleation agent if added is: $ZrO_2$: 1 mol % to 3 mol %, $TiO_2$: 0.5 mol % to 1.5 mol %, $P_2O_5$: 1 mol % to 3 mol %, $NaF+CaF_2$: 0 mol % to 4 mol %, or $La+Tm$: 0.1 mol % to 1 mol %. Various of nucleation agents are added during the glass melting process, and the prepared glass-ceramics contain various types of crystal nuclei, which increases the types of crystal nuclei, and thus decreases the nucleation and crystallization energy required for crystal precipitation and reduces temperature and time of the heat treatment. In an embodiment of the present invention, the glass in step S1 comprises: $SiO_2$: 65 mol % to 75 mol %, $Al_2O_3$: 6 mol % to 13 mol %, $B_2O_3$: 1 mol % to 3 mol %, $MgO_2$: 0 mol % to 7 mol %, $ZnO$: 1 mol % to 2 mol %, $K_2O$: 1 mol % to 3 mol %, $Na_2O$: 1 mol % to 7 mol %, $Li_2O$: 10 mol % to 20 mol %, $CeO$: 0.1 mol % to 0.25 mol %, and $SnO_2$: 0.2 mol % to 0.3 mol %. In the present invention, glass is obtained for melting, and a variety of different nucleation agents are added according to the needs of the actual production process. After this treatment, the obtained glass has a variety of crystal nuclei. After the above-mentioned glass with a dimension is obtained, it is placed under the condition of temperature T1 for annealing. After the annealing treatment is finished, the glass is placed under the condition of T2 for nucleation treatment. After the nucleation treatment, the glass is further placed under the condition of T3 for crystallization treatment. Thus, the glass-ceramics containing multiple-crystal nuclei with the crystal phases of lithium disilicate and petalite are prepared. The multi-crystal nucleus reduces the nucleation energy and crystallization energy required for crystal precipitation and is capable of reducing temperature and time of the heat treatment. Moreover, it can effectively increase the number of crystal nuclei in the glass-ceramic and reduce the crystal size by adjusting the crystal proportion, so that the damage resistance and the fracture toughness of the glass-ceramic are enhanced, thereby improving the service life of the glass-ceramic. On the other hand, due to the large number of crystal nuclei in the prepared glass-ceramics, a variety of crystal nuclei can effectively reduce the crystallization energy of the crystal, which is beneficial to the uniform distribution of the crystal phase in the glass-ceramic, to reduce the size of the crystal, to improve the visible light transmittance, and to enhance the practicality of the glass-ceramic. The above-mentioned technical solutions can also be applied to any other glass, and the corresponding conditions can be changed according to different components and requirements, so as to prepare different glass-ceramics. The preparation method has high versatility.

The method for preparing the multi-crystal nucleus composite transparent glass-ceramic further comprises a step S4 after step S3: placing the glass-ceramic obtained in S3 into a salt bath containing at least one of sodium nitrate, potassium nitrate, sodium carbonate, and potassium carbonate for at least one strengthening treatment, so as to prepare a reinforced glass-ceramic. Specifically, in an embodiment of the present invention, the salt bath for ion exchange in step S4 contains sodium nitrate, potassium nitrate, and sodium carbonate, and is subjected to two strengthening treatments, wherein the temperature of the first strengthening treatment is 380° C. to 450° C., the strengthening time is 1 h to 10 h; and the temperature of the second strengthening treatment is 380° C. to 450° C., and the strengthening time is 10 min~240 min. Specifically, in the present invention, the surface compressive stress of the strengthened glass-ceramics ranges from 400 MPa to 600 MPa, the depth of compressive stress layer ranges from 10 μm to 100 μm, and the tensile stress linear density is more than 30000 MPa/mm.

The following specific examples are given to further illustrate the preparation method provided by the present invention in more detail, but the protection scope of the invention is not limited in any way.

The glass in step 1 of the method for preparing a multi-crystal nucleus composite transparent glass-ceramic in Examples 1 to 6 and the formulation of the nucleation agent added are as follows:

| Component and Mole Percentage (mol %) | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Glass Formula | $SiO_2$ | 68 | 68 | 68 | 68 | 66 | 65 | 60.5 | 66 | 60.5 | 66 |
| | $Al_2O_3$ | 6 | 6 | 6 | 6 | 8 | 10 | 12 | 8 | 12 | 8 |
| | $B_2O_3$ | 1.5 | 1.5 | 3 | 1.5 | 1.5 | 2 | 3 | 1.5 | 1.5 | 1.5 |
| | $MgO$ | 2 | 2 | 2 | 3 | 2 | 2 | 2 | 0 | 0 | 2 |
| | $ZnO$ | 1 | 1 | 1 | 1 | 1 | 1 | 1 | 1 | 1 | 1 |
| | $K_2O$ | 1 | 1 | 1 | 1 | 1 | 1 | 1 | 1 | 1 | 1 |
| | $Na_2O$ | 2 | 2 | 2 | 1 | 2 | 2 | 2 | 4 | 4 | 2 |
| | $Li_2O$ | 15 | 15 | 15 | 15 | 15 | 15 | 15 | 15 | 15 | 15 |
| | $CeO_2$ | 0.2 | 0.2 | 0.2 | 0.2 | 0.2 | 0.2 | 0.2 | 0.2 | 0.2 | 0.2 |
| | $SnO_2$ | 0.3 | 0.3 | 0.3 | 0.3 | 0.3 | 0.3 | 0.3 | 0.3 | 0.3 | 0.3 |
| Nucleation Agent | $ZrO2$ | 1.5 | 1.5 | 1.5 | 1.5 | 1.5 | 1.5 | 1.5 | 1.5 | 1.5 | 1 |
| | $TiO2$ | 0.5 | 0.5 | 0.5 | 0.5 | 0.5 | 0.5 | 0.5 | 0.5 | 0.5 | 0.5 |
| | $P2O5$ | 1.5 | 1.5 | 1.5 | 1.5 | 1.5 | 1.5 | 1.5 | 1.5 | 1.5 | 2 |
| | $NaF + CaF2$ | 0 | 1 | 0 | 0 | 0 | 0 | 0 | 0 | 0 | 0 |
| | $La + Tm$ | 0.1 | 0.1 | 0.1 | 0.1 | 0.1 | 0.1 | 0.1 | 0.1 | 0.1 | 0.1 |

In Example 1 to Example 6, conditions and related parameters of the preparation process of the method for preparing the multi-crystal nucleus composite transparent glass-ceramic contained in each Example are shown in the following Table.

| Process | Process Parameter | Example 1 | Example 2 | Example 3 | Example 4 | Example 5 | Example 6 | Example 7 | Example 8 | Example 8 | Example 10 |
|---|---|---|---|---|---|---|---|---|---|---|---|
| Heat Treatment Process | Annealing Temperature (° C.) | 473 | 468 | 451 | 463 | 512 | 547 | 550 | 550 | 550 | 550 |
| | Annealing Time (min) | 240 | 240 | 240 | 240 | 240 | 240 | 240 | 240 | 240 | 240 |
| | Nucleation Temperature (° C.) | 523 | 518 | 501 | 513 | 562 | 580 | 580 | 580 | 580 | 580 |
| | Nucleation Time (min) | 120 | 120 | 120 | 120 | 120 | 120 | 240 | 240 | 240 | 240 |
| | Crystallization Temperature (° C.) | 620 | 620 | 620 | 620 | 620 | 620 | 620 | 620 | 620 | 620 |
| | Crystallization Time (min) | 60 | 60 | 60 | 60 | 60 | 60 | 120 | 120 | 120 | 120 |
| Strengthening Process (IOX1) | Strengthening Temperature (° C.) | 430 | 430 | 430 | 430 | 430 | 430 | 430 | 430 | 430 | 430 |
| | Strengthening Time (h) | 4 | 4 | 4 | 4 | 4 | 4 | 4 | 4 | 4 | 4 |
| | NaNO3 (wt %) | 90 | 95 | 100 | 95 | 95 | 95 | 90 | 90 | 90 | 90 |
| | KNO3 (wt %) | 5 | 5 | 0 | 5 | 5 | 5 | 5 | 5 | 5 | 5 |
| | Na$_2$CO$_3$ (wt %) | 5 | 0 | 0 | 0 | 0 | 0 | 5 | 5 | 5 | 5 |
| | K$_2$O$_3$ (wt %) | 0 | 0 | 0 | 0 | 0 | 0 | 0 | 0 | 0 | 0 |
| Strengthening Process (IOX2) | Strengthening Temperature (° C.) | 440 | 440 | 440 | 440 | 440 | 440 | 440 | 440 | 440 | 440 |
| | Strengthening Time (min) | 30 | 30 | 30 | 30 | 30 | 30 | 30 | 30 | 30 | 30 |
| | NaNO3 (wt %) | 5 | 5 | 5 | 5 | 5 | 5 | 5 | 5 | 5 | 5 |
| | KNO3 (wt %) | 95 | 95 | 95 | 95 | 95 | 95 | 95 | 95 | 95 | 95 |
| | Na$_2$CO$_3$ (wt %) | 0 | 0 | 0 | 0 | 0 | 0 | 0 | 0 | 0 | 0 |
| | K$_2$O$_3$ (wt %) | 0 | 0 | 0 | 0 | 0 | 0 | 0 | 0 | 0 | 0 |

The properties of glass, glass-ceramic and reinforced glass-ceramic in Example 1 to Example 6 are compared in the following Table.

| Properties | Example 1 | Example 2 | Example 3 | Example 4 | Example 5 | Example 6 | Example 7 | Example 8 | Example 9 | Example 10 |
|---|---|---|---|---|---|---|---|---|---|---|
| Thickness D of Glass Article (μm) | 0.65 | 0.65 | 0.65 | 0.65 | 0.65 | 0.65 | 0.65 | 0.65 | 0.65 | 0.65 |
| Vickers Hardness of Glass Article (kgf/mm$^2$) | 660 | 672 | 641 | 658 | 644 | 709 | 760 | 712 | 775 | 708 |
| Average Crystal Size in Glass-Ceramic (nm) | 35 | 52 | 54 | 64 | 54 | 67 | 73 | 63 | 76 | 65 |
| Crystal Proportion in Glass-Ceramic (wt %) | 72 | 68 | 77 | 81 | 65 | 59 | 56 | 61 | 55 | 60 |
| Vickers Hardness of Glass-Ceramic (kgf/mm$^2$) | 785 | 790 | 752 | 784 | 792 | 823 | 800 | 753 | 812 | 756 |

-continued

| Tensile Stress Linear Density of Glass-Ceramic (MPa/mm) | 32528 | 33195 | 32681 | 32711 | 33250 | 35976 | 37538 | 35411 | 37445 | 34926 |
|---|---|---|---|---|---|---|---|---|---|---|
| Visible Light Transmittance of Glass-Ceramic (%) | 92 | 91 | 86 | 91 | 89 | 87 | 86 | 89 | 86 | 88 |
| Surface Compressive Stress After Strengthening (MPa) | 468 | 472 | 432 | 513 | 547 | 584 | 548 | 533 | 562 | 524 |
| Depth of Compressive Stress Layer After Strengthening (μm) | 89 | 87 | 93 | 77 | 65 | 63 | 62 | 67 | 66 | 69 |
| Vickers Hardness After Strengthening (kgf/mm$^2$) | 785 | 790 | 752 | 784 | 792 | 823 | 800 | 753 | 812 | 756 |

The following took Example 1 as an example for further analysis:

Step S1, according to the glass formula in Example 1, a nucleation agent was added for melting to prepare glass.

Step S2, a glass article with a dimension was obtained from the glass obtained in S1, wherein the glass article had a thickness D of 0.65 mm and a Vickers hardness of 660 kgf/mm$^2$.

Step S3, the obtained glass article was placed under a temperature condition of 473° C. and was heated for 240 minutes to perform annealing treatment. After the annealing treatment, the glass article was placed under a temperature condition of 523° C. and was heated for 120 minutes to perform nucleation treatment. After the nucleation treatment was finished, it was further placed under a temperature condition of 620° C. and was heated for 60 minutes to prepare a glass-ceramic. The obtained glass-ceramic had a Vickers hardness of 785 kgf/mm$^2$, and the glass-ceramic had a tensile stress linear density of 32528 MPa/mm and a visible light transmittance of 92%. The crystal proportion in the glass-ceramic was 72 wt %, and the average crystal size in the glass-ceramic was 35 nm.

Step S4, two strengthening treatments was performed on the glass-ceramic in this Example. The first strengthening treatment: the prepared glass-ceramic was placed in a mixed salt bath containing 90 wt % NaNO$_3$, 5 wt % KNO$_3$ and 5 wt % Na$_2$CO$_3$ to perform the first strengthening treatment process, wherein the strengthening temperature was 430° C., and the strengthening time was 4 hours. The second strengthening treatment: the glass-ceramic that had undergone the first strengthening treatment process was placed in a mixed salt bath containing 5 wt % NaNO$_3$ and 95 wt % KNO$_3$ to perform the second strengthening treatment process, wherein the strengthening temperature was 440° C. and the strengthening time was 30 minutes. The strengthened glass-ceramic had a surface compressive stress of 468 MPa, a depth of compressive stress layer of 89 μm, and a Vickers hardness of 789 kgf/mm$^2$.

The nucleation agents ZrO$_2$, TiO$_2$, P$_2$O$_5$, and La+Tm were added to the glass in this Example during its melting process, so that various crystal nuclei of ZrO$_2$, TiO$_2$, P$_2$O$_5$, La, and Tm were formed in the obtained glass. The multi-crystal nucleus reduced the nucleation energy and crystallization energy required for crystal precipitation, which could reduce temperature and time of the heat treatment, adjust the crystal proportions, and increase the number of crystal nuclei in glass-ceramic. Multiple-crystal nuclei could effectively reduce the crystallization energy of crystals, which was beneficial to uniform distribution of crystal phase in the glass-ceramic, and reduced the crystal size. The crystal proportion in the prepared glass-ceramic was 72 wt %, and the average crystal size of the crystals was controlled at 35 nm, which enhanced the damage resistance and fracture toughness of the glass-ceramic. Because of the large number of crystal nuclei and small crystal size, the glass-ceramic had the visible light transmittance of more than 86% (which was 92% in this Example), which improved the visible light transmittance. The prepared glass-ceramic could be used in the production of cover plates for electronic products, so as to improve the practicality of the glass-ceramic.

The following took Example 6 as an example for further analysis:

Step S1, according to the glass formula in Example 6, a nucleation agent was added for melting to prepare glass.

Step S2, a glass article with a dimension was obtained from the glass obtained in S1, wherein the glass article had a thickness D of 0.65 mm and a Vickers hardness of 709 kgf/mm$^2$.

Step S3, the obtained glass article was placed under a temperature condition of 547° C. and was heated for 240 minutes to perform annealing treatment. After the annealing treatment, the glass article was placed under a temperature condition of 580° C. and was heated for 120 minutes to perform nucleation treatment. After the nucleation treatment was finished, it was further placed under a temperature condition of 620° C. and was heated for 60 minutes to prepare the glass-ceramic. The obtained glass-ceramic had a Vickers hardness of 823 kgf/mm$^2$, and the glass-ceramic had a tensile stress linear density of 32528 MPa/mm and a visible light transmittance of 87%. The crystal proportion in the glass-ceramics was 59 wt %, and the average crystal size in the glass-ceramic was 67 nm.

Step S4, two strengthening treatments was performed on the glass-ceramic in this Example. The first strengthening treatment: the prepared glass-ceramic was placed in a mixed salt bath containing 95 wt % NaNO$_3$ and 5 wt % KNO$_3$ to perform the first strengthening treatment process, wherein the strengthening temperature was 430° C., and the strengthening time was 4 hours. The second strengthening treatment:

the glass-ceramic that had undergone the first strengthening treatment process was placed in a mixed salt bath containing 5 wt % $NaNO_3$ and 95 wt % $KNO_3$ to perform the second strengthening treatment process, wherein the strengthening temperature was 440° C. and the strengthening time was 30 minutes. The strengthened glass-ceramic had a surface compressive stress of 584 MPa, a depth of compressive stress layer of 63 μm, and a Vickers hardness of 823 kgf/mm².

The nucleation agents $ZrO_2$, $TiO_2$, $P_2O_5$, and La+Tm were added to the glass in this Example during its melting process, so that various crystal nuclei of $ZrO_2$, $TiO_2$, $P_2O_5$, La, and Tm were formed in the obtained glass. The multi-crystal nucleus reduced the nucleation and crystallization energy required for crystal precipitation, which could reduce temperature and time of the heat treatment. Furthermore, adjustment of the crystal proportion could effectively increase the number of crystal nuclei in the glass-ceramics. Multiple-crystal nuclei could effectively reduce the crystallization energy of crystals, which was beneficial to the uniform distribution of the crystal phase in the glass-ceramics, and reduced the crystal size. The crystal proportion in the prepared glass-ceramics was 59 wt %, and the average crystal size of the crystals was controlled at 67 nm, which enhanced the damage resistance and fracture toughness of the glass-ceramic. Because of the large number of crystal nuclei and small crystal size, the glass-ceramics had the visible light transmittance of more than 86% (which was 87% in this Example), which improved the visible light transmittance. The prepared glass-ceramics could be used in the production of cover plates for electronic products, so as to improve the practicality of the glass-ceramic.

The following took Example 10 as an example for further analysis:

Step S1, according to the glass formula in Example 10, a nucleation agent was added for melting to prepare glass.

Step S2, a glass article with a dimension was obtained from the glass obtained in S1, wherein the glass article had a thickness D of 0.65 mm and a Vickers hardness of 708 kgf/mm².

Step S3, the obtained glass article was placed under a temperature condition of 550° C. and was heated for 240 minutes to perform annealing treatment. After the annealing treatment, the glass article was placed under a temperature condition of 580° C. and was heated for 120 minutes to perform nucleation treatment. After the nucleation treatment was finished, it was further placed under a temperature condition of 620° C. and was heated for 120 minutes to prepare the glass-ceramic. The obtained glass-ceramic had a Vickers hardness of 756 kgf/mm², and the glass-ceramic had a tensile stress linear density of 34926 MPa/mm and a visible light transmittance of 88%. The crystal proportion in the glass-ceramic was 60 wt %, and the average crystal size in the glass-ceramic was 65 nm.

Step S4, two strengthening treatments was performed on the glass-ceramic in this Example. The first strengthening treatment: the prepared glass-ceramic was placed in a mixed salt bath containing 90 wt % $NaNO_3$, 5 wt % $KNO_3$ and 5 wt % $Na_2CO_3$ to perform the first strengthening treatment process, wherein the strengthening temperature was 430° C., and the strengthening time was 4 hours. The second strengthening treatment: the glass-ceramic that had undergone the first strengthening treatment process was placed in a mixed salt bath containing 5 wt % $NaNO_3$ and 95 wt % $KNO_3$ to perform the second strengthening treatment process, wherein the strengthening temperature was 440° C. and the strengthening time was 30 minutes. The strengthened glass-ceramic had a surface compressive stress of 524 MPa, a depth of compressive stress layer of 69 μm, and a Vickers hardness of 756 kgf/mm².

The nucleation agents $ZrO_2$, $TiO_2$, $P_2O_5$, and La+Tm were added to the glass in this Example during its melting process, so that various crystal nuclei of $ZrO_2$, $TiO_2$, $P_2O_5$, La, and Tm were formed in the obtained glass. The multi-crystal nucleus reduced the nucleation and crystallization energy required for crystal precipitation, which could reduce temperature and time of the heat treatment. Furthermore, adjustment of the crystal proportion could effectively increase the number of crystal nuclei in the glass-ceramics. Multiple-crystal nuclei could effectively reduce the crystallization energy of crystals, which was beneficial to the uniform distribution of the crystal phase in the glass-ceramics, and reduced the crystal size. The proportion of crystals in the prepared glass-ceramics was 60 wt %, and the average crystal size of the crystals was controlled at 65 nm, which enhanced the damage resistance and fracture toughness of the glass-ceramics. Because of the large number of crystal nuclei and small crystal size, the glass-ceramics had a visible light transmittance of more than 86% (which was 88% in this Example), which improved the visible light transmittance. The prepared glass-ceramics could be used in the production of cover plates for electronic products, so as to improve the practicality of the glass-ceramics.

In summary, the present invention provides the multi-crystal nucleus composite transparent glass-ceramic and the preparation method thereof. Various types of crystal nuclei are allowed to present in the glass by adding at least two of nucleation agents $ZrO_2$, $TiO_2$, $P_2O_5$, $NaF+CaF_2$, and La+Tm during the glass melting process, and placing the resultant under the conditions of T1, T2, and T3 to perform annealing treatment, nucleation treatment, and crystallization treatment, respectively, to prepare glass-ceramics having a variety of crystal nuclei and a large number of crystal nuclei with crystal phases of lithium disilicate and petalite. Thus formed multi-crystal nucleus reduces the nucleation and crystallization energy required for crystal precipitation, which allows decreasing temperature and time of the heat treatment, adjusting the crystal proportion and reducing the crystal size, which enhance the damage resistance and fracture toughness of glass-ceramics. Meanwhile, the two crystal phases of lithium disilicate and petalite are intertwined with each other to enhance the damage resistance, thereby improving the service life of glass-ceramics. Since a large number and a variety of crystal nuclei present in the prepared glass-ceramic, the crystallization energy of the crystal can be effectively reduced, which is beneficial to the uniform distribution of the crystal phase in the glass-ceramic, the reduction in the crystal size, the improvement of the visible light transmittance, and the enhancement of practicality of the glass-ceramic.

The above is merely the preferred examples of the present invention, and is not intended to limit the present invention. Any modifications, equivalent replacements and improvements made within the spirit and principles of the present invention should be included in the protection scope of the present invention.

The invention claimed is:

1. A multi-crystal nucleus composite transparent glass-ceramic, wherein a crystal nucleus comprises $ZrO_2$, $TiO_2$, $P_2O_5$, La, and Tm; a crystal phase comprises lithium disilicate and petalite; a surface compressive stress at any side of the glass-ceramic ranges from 400 MPa to 600 MPa, a depth of compressive stress layer of the glass-ceramic ranges from 10 μm to 100 μm, and a tensile stress linear density of the glass-ceramic is more than 30000 MPa/mm.

2. The multi-crystal nucleus composite transparent glass-ceramic according to claim 1, wherein the crystal nucleus further comprises a constituent selected from the group consisting of fluoride, gold, silver, and a combination thereof.

3. The multi-crystal nucleus composite transparent glass-ceramic according to claim 1, wherein the crystal nucleus further comprises fluoride, and the fluoride in the crystal nucleus is NaF and/or $CaF_2$.

4. The multi-crystal nucleus composite transparent glass-ceramic according to claim 1, wherein the surface compressive stress at any side of the glass-ceramic ranges from 500 MPa to 600 MPa, and the depth of compressive stress layer of the glass-ceramic ranges from 20 μm to 90 μm.

5. The multi-crystal nucleus composite transparent glass-ceramic according to claim 1, wherein the glass-ceramic has an average crystal size of 50 nm to 150 nm, a mass proportion of the crystal is more than or equal to 80%, and the glass-ceramic with a thickness of 1 mm has an average visible light transmittance of 86% to 93%.

6. The multi-crystal nucleus composite transparent glass-ceramic according to claim 1, wherein the glass-ceramic has a tensile stress linear density ranges from 30000 MPa/mm to 44000 MPa/mm.

7. A method for preparing the multi-crystal nucleus composite transparent glass-ceramic according to claim 1, comprising:

S1: adding a nucleation agent when melting raw materials to prepare a glass;

S2: obtaining a glass article of a dimension from the glass obtained in S1; and

S3: heating the glass article obtained in S2 at a temperature T1 for 1 hour to 6 hours for annealing treatment; after finishing the annealing treatment, heating at a temperature T2 for 1 hour to 6 hours to perform nucleation treatment; after finishing the nucleation treatment, heating at a temperature T3 for 0 to 3 hours to perform crystallization treatment, so as to prepare a glass-ceramic; and S4: placing the glass-ceramic obtained in S3 into a salt bath containing at least one of sodium nitrate, potassium nitrate, sodium carbonate, and potassium carbonate for at least one strengthening treatment, thereby preparing a reinforced glass-ceramic;

wherein the temperature T1 ranges from 450° C. to 550° C., the temperature T2 ranges from 500° C. to 580° C., and the temperature T3 ranges from 600° C. to 800° C., and T1<T2.

8. The method for preparing the multi-crystal nucleus composite transparent glass-ceramic according to claim 7, wherein the nucleation agent added in step S1 comprises: 1 mol % to 3 mol % of $ZrO_2$, 0.5 mol % to 1.5 mol % of $TiO_2$, 1 mol % to 3 mol % of $P_2O_5$, and La and Tm in a total amount of 0.1 mol %.

9. The method for preparing the multi-crystal nucleus composite transparent glass-ceramic according to claim 7, wherein the glass in step S1 comprises: $SiO_2$:65 mol % to 75 mol %, $Al_2O_3$:6 mol % to 13 mol %, $B_2O_3$:1 mol % to 3 mol %, $MgO_2$:0 mol % to 7 mol %, ZnO: 1 mol % to 2 mol %, $K_2O$:1 mol % to 3 mol %, $Na_2O$: 1 mol % to 7 mol %, $Li_2O$: 10 mol % to 20 mol %, CeO: 0.1 mol % to 0.25 mol %, $SnO_2$:0.2 mol % to 0.3 mol %.

10. The method for preparing the multi-crystal nucleus composite transparent glass-ceramic according to claim 7, wherein in step S3, the temperature T1 ranges from 500° C. to 550° C., the temperature T2 ranges from 560° C. to 580° C., and the temperature T3 ranges from 700° C. to 800° C., and T1<T2.

11. The method for preparing the multi-crystal nucleus composite transparent glass-ceramic according to claim 7, wherein the nucleation agent added in step S1 further comprises NaF and $CaF_2$ in a total amount of 1 mol % to 4 mol %.

12. The method for preparing the multi-crystal nucleus composite transparent glass-ceramic according to claim 7, wherein the salt bath contains at least two of sodium nitrate, potassium nitrate, sodium carbonate and potassium carbonate.

13. The method for preparing the multi-crystal nucleus composite transparent glass-ceramic according to claim 7, wherein two strengthening treatments are performed in step S4, a temperature of a first strengthening treatment is 380° C. to 450° C., and a strengthening time is 1 hour to 10 hours; and a temperature of a second strengthening treatment is 380° C. to 450° C., and a strengthening time is 10 min to 240 min.

14. The multi-crystal nucleus composite transparent glass-ceramic according to claim 1, wherein the nucleation agent added when preparing the multi-crystal nucleus composite transparent glass-ceramic comprises 1 mol % to 3 mol % of $ZrO_2$, 0.5 mol % to 1.5 mol % of $TiO_2$, 1 mol % to 3 mol % of $P_2O_5$, and La and Tm in a total amount of 0.1 mol % to 1 mol %.

15. The multi-crystal nucleus composite transparent glass-ceramic according to claim 3, wherein the nucleation agent added when preparing the multi-crystal nucleus composite transparent glass-ceramic further comprises NaF and $CaF_2$ in a total amount of 1 mol % to 4 mol %.

* * * * *